United States Patent
Rossman et al.

[11] Patent Number: 5,836,048
[45] Date of Patent: *Nov. 17, 1998

[54] UNIVERSAL FIRE BARRIER GROMMET

[75] Inventors: John Alfred Rossman, Lakewood; Jayant Dahyabhai Patel, Lake Forest, both of Calif.

[73] Assignee: McDonnell Douglas Corporation, St. Louis, Mo.

[ * ] Notice: This patent issued on a continued prosecution application filed under 37 CFR 1.53(d), and is subject to the twenty year patent term provisions of 35 U.S.C. 154(a)(2).

[21] Appl. No.: 694,876

[22] Filed: Aug. 9, 1996

[51] Int. Cl.$^6$ .................................................. B65D 53/06
[52] U.S. Cl. .......................... 16/2.2; 16/2; 174/153 G; 277/178
[58] Field of Search .................. 16/2.1, 2.2; 174/152 G, 174/153 G; 181/290; 524/444; 60/253; 137/375

[56] References Cited

U.S. PATENT DOCUMENTS

| | | | |
|---|---|---|---|
| 3,244,802 | 4/1966 | Sturtevant | 16/2.2 |
| 3,424,857 | 1/1969 | Miller | 174/153 |
| 3,518,259 | 6/1970 | Trimble | 16/2.2 |
| 4,207,918 | 6/1980 | Burns | 137/357 |
| 4,401,243 | 8/1983 | Diederich et al. | 222/591 |
| 4,685,173 | 8/1987 | Pavur | 16/2.2 |
| 4,800,984 | 1/1989 | Kerman | 181/290 |
| 4,901,395 | 2/1990 | Semrau | 16/2 |
| 5,071,143 | 12/1991 | Byerly | 277/178 |
| 5,106,901 | 4/1992 | Paterson | 524/444 |
| 5,212,944 | 5/1993 | Martin | 60/253 |
| 5,408,740 | 4/1995 | Dee | 29/631 |

*Primary Examiner*—Andrea L. Pitts
*Assistant Examiner*—Mark Williams
*Attorney, Agent, or Firm*—Bell Seltzer Intellectual Property Law Group of Alston & Bird LLP

[57] ABSTRACT

The larger of the two flanges in a grommet contains a tip portion that extends back toward the other tapered flange and overlies the circumferential slot between the two flanges to define a grommet having application to panels of a variety of thicknesses. The tip portion elastically bends, upon installing the grommet in a panel, responsive to force exerted by a side wall of the panel. It exerts an elastic reaction force pressing on a side of the panel. Concurrently it pulls the other tapered flange into contact with the opposed surface of the panel through elastic force exerted through the grommets midsection. This seals the flanges against the panel's sides, notwithstanding a circumferential slot width greater than the panel's thickness and notwithstanding a panel mounting hole having a greater diameter than the bottom surface of that slot. A fire resistant layer is integrally formed or applied in that outer surface of the grommet containing the larger flange.

7 Claims, 1 Drawing Sheet

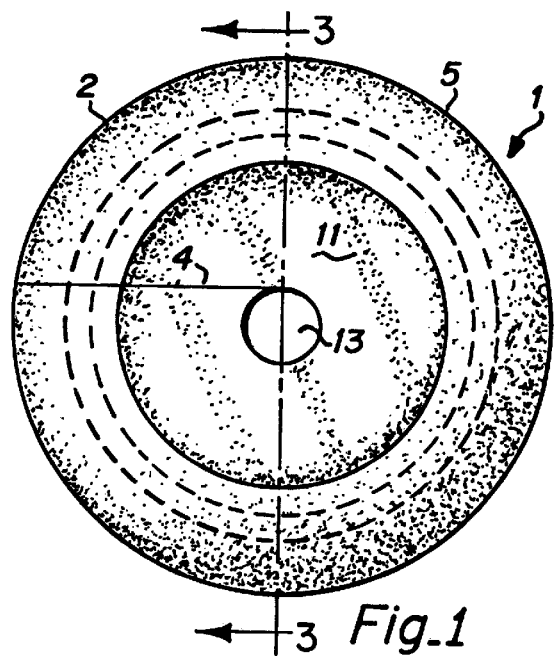
Fig_1
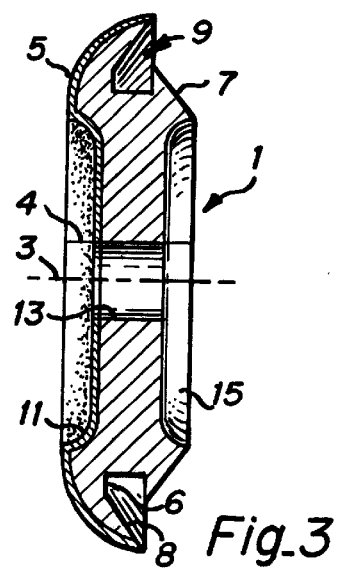
Fig_3
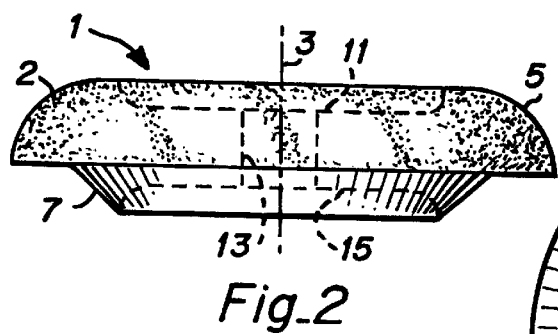
Fig_2
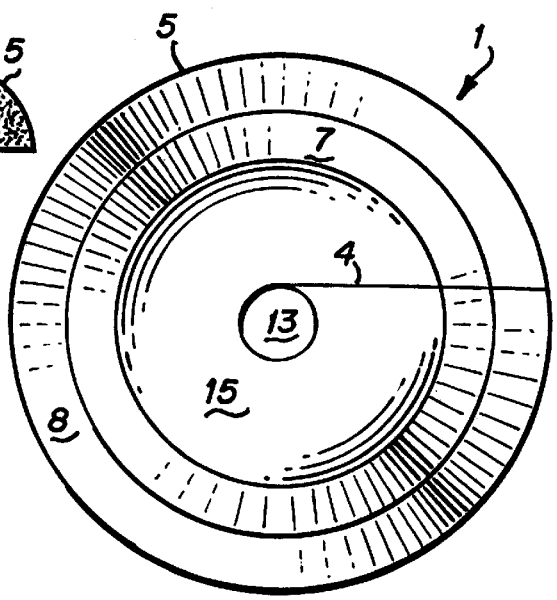
Fig_4
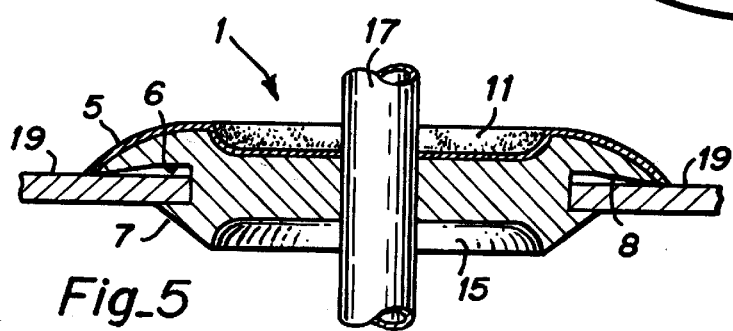
Fig_5

UNIVERSAL FIRE BARRIER GROMMET

FIELD OF THE INVENTION

This invention relates to grommets, and, more particularly, to a universal grommet structure that is capable of sealing application in firewalls of different thicknesses.

BACKGROUND

Grommets are known hardware devices commonly used to mount insulated wire and other tubular material through panel sheet material or walls, usually formed as a molded body of homogeneous rubber-like elastomeric material such as silicone polymer.

Electrical and hydraulic equipment installed in vehicles, such as in aircraft, often have component parts located at different positions within the vehicle, such as an electrical generator or computer, located remote from a control switch and/or sensor. Those parts are electrically interconnected by electrical cables or wires which bridge the intervening distance between the separate parts and place them in electrical circuit. Hydraulic equipment conduits, referred to as hydraulic lines, extend through the craft to different locations. Frequently, those locations are separated by metal walls, which is typically the case found in aircraft application and the connecting cables must extend through holes formed in those metal walls.

The grommet is mounted into such a hole and the cable is inserted through a passage in the grommet. The grommet prevents contact between the metal wall and the cables, preventing the insulation on the cable from scraping against the sharp metal edges surround the hole when vibrations occurring during the operation of the vehicle. Otherwise the metal could wear away the wire insulation and could result in an electrical short circuit and/or other equipment failure. The grommet also prevents the metal hole edge from cutting through that insulation, should an installer pull too strongly on the wire. Being of elastic rubber-like material and, typically, electrically non-conductive in characteristic, the grommet serves as a cushion or stress relief for the wire; and further electrically insulates the wire from the wall. Moreover, should the grommet's central passage be sized to the outer diameter of the wire or cable, the friction inhering between the material of the grommet and the outer surface of the wire or cable helps to grip and hold the wire in place.

Structurally, a typical grommet contains a rear radially extending flange section with an inwardly tapered surface, a front radially outwardly extending flange section, axially spaced from the rear flange section, a circumferentially extending slot, located between those two flange sections and recessed radially from the flange sections and a central passage that extends front to back along the grommet's axis. Each flange includes a flat radially extending surface forming ends to the slot and whose extent is greater in size than the hole in the panel. To install, the grommet is forced through a hole formed in the wall, with the tapered rear flange oriented toward the hole. In proceeding into the hole the rear flange elastically bends over, and, as that flange is pushed further through to the other side of the wall, the flange elastically radially expands against the other side of the wall. The circumferential slot lies within the passage through the wall; with the sides of the two flanges bordering the slot serving as stops or barriers that prevent the grommet from slipping out of the hole. With that structure the grommet is essentially snapped into place and anchored in the wall.

For a wall of given thickness, the grommet selected is one with a circumferential slot that is of a width essentially equal to the wall thickness and of a diameter slightly less than the diameter of the wall opening in which it is mounted. Thus in present practice a large assortment of grommets with slots of different widths and diameters is available for use with walls of different thickness and different pass through holes.

Being relatively inexpensive, the acquisition of a large variety of grommets should not in itself serve as much of an impediment. However, the assembly of an aircraft or the assembly of modifications to equipment within existing aircraft is performed by assemblers and installers whose time is expensive. When retrofitting an aircraft with new equipment, the installer must route cable through a number of walls and barriers. The installer must take the time to estimate the wall's thickness, then fumble around to select and retrieve the correct size grommet, before inserting it. This takes additional time and requires judgment, which adds to assembly cost. Some installers who do not immediately make the correct choice and who are anxious to complete the job on-time, sometimes force a grommet of an incorrect size into the hole, an improper practice and one which can result later in equipment problems. A significant savings is realized if the installer is not required to exercise that judgment and is able to simply reach into a box of grommets of a single slot size and withdraw and install a grommet, irrespective of the wall thickness and irrespective of the hole diameter.

An object of the present invention, thus, is to provide a grommet of universal application. Advantageously, the present invention provides such a grommet. The present invention defines a new grommet geometry that for a given hole size is capable of fitting within different walls that can vary in thickness over a wide range.

A second concern is fire. Aircraft carry combustible fuel to power the engines and often carry combustible cargo, which can be ignited by a spark, such as occurring through an electrical system failure nearby or even spontaneously should preventive systems fail. Should a fire occur the desire is to automatically detect and extinguish it and, at a minimum, to limit its spread; and the structure and equipment in modern aircraft perform that function well. In the structural area, thus, one or more of the aircraft's walls serve to seal or close one compartment within the aircraft from another to prevent any fire in one compartment from rapidly cascading into the adjacent compartments within the aircraft. These walls are referred to as firewalls. Firewalls are found in other vehicles as well, such as between the driver and the engine compartment in automobiles, so that the driver has time to escape the vehicle should an engine fire occur. By preventing or delaying the spread of fire on board an aircraft, the aircraft crew is given more time to either extinguish the fire or to locate a place to land the aircraft and allow crew and passengers to escape.

The wall openings previously herein addressed include the firewalls. The firewalls are fitted with grommets; and the grommets are stuffed with wires, and leave at best a small crack of opening. However, the openings become enlarged, and large enough to permit passage of smoke and flame, should the fire, on one side of the wall, melt the grommet, as could occur with grommets formed of rubber; and be of such intensity as to melt any insulating coatings on the wires extending through those openings. Even grommets formed of silicone, the grommet material of present choice in the industry, though incorporating fire retardant ingredients, ultimately fails in the face of flames. To minimize even that small opportunity for a fire to spread, the grommet should also be fire resistant.

Another object of the invention, therefore, is to provide a grommet structure that resists melting when exposed to flames. Advantageously, the invention incorporates a fire retardant layer or mating in combination with a self extinguishing elastomer compound for the principle flange sections and other portions of the grommet body in an integral structure, retaining the elasticity required for a grommet while providing a barrier to the flame.

SUMMARY OF THE INVENTION

In accordance with the foregoing objects, the invention defines a new grommet structure, formed principally of elastomeric material, in which the larger of the two radially outwardly extending grommet flanges contains a tip or end portion that extends back toward the other flange and overlies the grommet's circumferential slot between the two flanges. The foregoing permits the application of the grommet to panels of a variety of thicknesses.

Upon installation in a panel, the flange end portion elastically bends responsive to force exerted by a side wall of the panel, exerts an elastic reaction force upon a side of the panel and, concurrently, through elastic force exerted through the grommet's midsection, pulls the other flange into contact with the opposed surface of the panel to thereby seal the two flanges against the panel. A fire resistant layer, suitably a woven fiber cloth, is integral with the elastomeric material on the side of the grommet that contains the larger flange and serves as the grommet's outer surface.

The foregoing provides a single piece construction that snaps into a properly sized panel opening quickly and easily and holds in place without the need for adhesives. It provides a fire resistant seal to the wall opening. A single size accommodates a variety of panel thicknesses. The grommet is self-extinguishing, does not drip or spread fire, and does not emit noxious or flammable smoke upon exposure to flame.

The foregoing and additional objects and advantages of the invention together with the structure characteristic thereof, which was only briefly summarized in the foregoing passages, becomes more apparent to those skilled in the art upon reading the detailed description of a preferred embodiment, which follows in this specification, taken together with the illustration thereof presented in the accompanying drawings.

BRIEF DESCRIPTION OF THE DRAWINGS

In the drawings:

FIG. 1 is a front elevational view of an embodiment of the invention;

FIG. 2 is a side elevational view thereof;

FIG. 3 is a section view thereof;

FIG. 4 is a rear elevational view; and

FIG. 5 is a pictorial section view of the embodiment of FIG. 1 as installed in a panel.

DESCRIPTION OF THE PREFERRED EMBODIMENT

The grommet structure is illustrated in FIGS. 1 and 2 in front elevation view and side elevation views, respectively. FIG. 3 presents a section view taken along the lines 3—3 in FIG. 1. FIG. 4 is a rear elevation view, illustrating the reverse side of FIG. 1. These figures may be considered concurrently.

The body 1 is essentially a figure of revolution taken about a central axis 3 and is symmetrical about that axis. It is formed, principally, of a molded elastomeric material that provides desired elasticity, silicone as example. In the side view of FIG. 2, the grommet's geometry resembles a large diameter shallow bowl with rounded sides levitating in inverted position over a smaller diameter shallow saucer. The front surface is textured, reflecting the surface of a mat 2, partially illustrated, integrated into the elastomeric material, later herein described in greater detail. The body contains a front flange 5 and rear flange 7 at spaced positions along that axis with a circumferential slot 9 in between, the latter defined by flat sidewalls to the flanges and an annular ring about the grommet body's midsection. Front flange 5 surrounds a well 11 formed by a recess from the front edge. That well contains a central cylindrical passage 13 that extends through the body along the axis.

As shown in the section view of FIG. 3 and in the rear view of FIG. 4, rear flange 7 surrounds a recessed central well 15, that is recessed from the most distal edge on the grommet's rear end axially into the body into which the central passage 13 opens. The rear flange extends radially outwardly and is of a maximum diameter where the taper begins. That flange is tapered axially downwardly toward the grommet's rear end, shown to the right in the figure, to provide a sloping surface.

The front flange 5 includes a flat portion that defines one wall to the circumferential slot. It also includes a tapered portion 8, its tip end, that turns back; that is, extends toward the rear end of the grommet where flange 7 is located. The front surface of flange 5 curves back smoothly as the flange extends radially outwardly and along the axis in the rearward direction. The outer edge of that flange extends to a maximal radially distance at a position back from the front edge and overlying slot 9. The diameter of the flange at that location is greater than the corresponding maximum diameter of the other flange 7.

As formed and in its dormant unstressed state, the tip of flange 5 extends over the axial length of the slot 9. When inserted into an opening in a panel, in being forced into place, flange tip 8 elastically flexes back to accommodate fitting the grommet into the panel. That is, the side of the panel forces the flange web to resiliently bend. The degree of such flexure depends on the thickness of the panel. If the panel's thickness is one half the axial length of the slot, the flange tip flexes back only slightly. If the panel is as thick as that slot's axial length, then the tip flexes back to its greatest extent. In either case, due to the inherent elasticity in the flange, creating an elastic force, at least some portion of that flange presses against the panel wall, providing a tight seal and, through the grommet's body, forces a flat side of the other flange 7 against the opposed side of the panel. The grommet thus accommodates panels of a wide range of thicknesses.

The front surface of the grommet contains a layer or mat 2, comprising woven fibers, of a fire resistant material, such as fiber glass or Nextel ceramic fabric, which produces a textured surface in appearance as partially illustrated in FIGS. 1 and 2. The mat is "embedded" in the elastomeric material or otherwise adhered therewith to form an integral assembly. That is, when the elastomeric material is in a semi-liquid softened state, the mat and elastomer are pressed together. This results in some portions of the elastomer oozing into the cracks and crevices between the woven fibers. When the elastomer is cured, those portions that have so leaked into the cracks create a frictional grip or bond to the fibers, thereby holding the mat in place.

It was earlier noted that body 1 is essentially a figure of revolution in geometry. The exception to that is a cut 4 is through the grommet. As illustrated in FIGS. 1 and 4, the cut 4, represented by a line in the figure, extends from a location tangent to the central passage 13 in a straight line to an outer edge of the grommet body and extends completely through the body. This technique is conventional. It permits the grommet to be installed onto earlier installed wires or lines. By pulling the grommet apart about that slice, the grommet may be placed over a cable or tube. It is then pressed back together and pushed along the cable or tube into the opening in the panel. As is appreciated the inclusion of cut 4 is optional.

Given the foregoing structure for the grommet, those skilled in the art appreciate that an appropriate elastomer and fire resistant material may be formed as a unitary one-piece assembly through application of any conventional technique, such as molding. As example, the fire resistant cloth is cut to shape and inserted within one section of a two part mold, the latter defining the geometry of the grommet. The elastomeric material in fluid form is injected into the mold and then cured. Upon withdrawal from the mold the fire resistant cloth is firmly adhered to the elastomeric material. For aircraft application a silicon polymer grommet material should withstand temperature extremes of between −80 degrees to 400 degrees F., maintain flexibility at low temperatures and be resistant to phosphate ester hydraulic fluid, and lubricating oil and possess good compression set resistance.

One published elastomeric compound that appears suitable contains the components, listed hereafter, mixed together in the relative amounts, by weight, as listed.

| Component | Units by Weight in Compound |
| --- | --- |
| Dow Corning Silastic HS-50 | 75 |
| Dow Corning Silastic LT-50 | 25 |
| Dow Corning Silastic FR-1 | 20 |
| Varox DBPH-50 (catalyst) | 0.72 |

The Silastic HC-50 is a methyl vinyl polysiloxane compound having high tensile and tear strength and a hardness providing for a durometer "A" of about fifty five. The Silastic LT-50 material is a methyl phenyl polysiloxane. That material remains flexible at low temperatures, such as are encountered by an airplane on or near the ground or in the upper atmosphere. Such compounds exhibit good flexibility and resilience at temperatures as low as −65 degrees Fahrenheit, such as occurs in unheated portions of an aircraft during flight. The Silastic FR-1 is added for fire resistance. It is a dispersion of various ingredients including Platinum, in a polysiloxane. The catalyst is Varox DBPH-50, which is marketed by the Los Angeles sales office of R. T. Vanderbuilt company. The catalyst provides for the curing of the mixture of the components.

After the mixture is inserted into the mold, it is press cured at a pressure of approximately 2,000 psi and at a temperature of approximately 340 degrees F. for a period of about twelve minutes.

The mold is opened and the fire resistant cloth mat, suitably formed to the correct pattern, including the formed central opening, is placed onto the mold. The mold is then reclosed, thereby pressing the soft elastic material into contact with the mat. Suitably, portions of the soft elastic material work into the small spaces between the fibers and serve to grip the mat, holding the mat in place on the surface of the structure. This step is omitted in those embodiments that do not contain the fire resistant cloth.

Then the structure is oven post-cured at a temperature of approximately 450 degrees F. for a period of approximately eight hours without any pressure being applied to the material. Following curing, cut 4 may then be made through the grommet body, as desired, with conventional cutting tools.

Reference is made to the pictorial section view of FIG. 5, which shows the grommet 1 as installed over a tube 17 within a panel 19. As illustrated, the tube 17 extends through the grommet's central passage. The end of flange 5 is elastically deformed and presses against one side of panel 19. The elastic force also pulls through the midsection of the grommet body and presses the flat surface of flange 7 against the opposed side of panel 19. Panel opening diameters are determined by usage of tubular material or insulated electrical wire. When used for tubular material, the panel hole size is determined by the size of the fittings for the tubular material or the largest cross section area that passes through the panel. When used for insulated electrical wire, the panel hole size is determined by the size of the end connector attached to that wire, which should be able to pass through the panel hole. In this installation, it is seen that the panel opening is just slightly larger in diameter than the diameter of the annular ring portion of circumferential slot 9, ensuring a snug fit. Additionally, the thickness of the panel is less than the axial length of that circumferential slot.

It is appreciated that the angled flange design seals over a large range of panel thicknesses. In one specific embodiment the grommet satisfactorily mounted to panels having thicknesses from 0.030 inches to 0.125 inches. The grommets are sized to fit panel hole diameters snugly to insure obtaining a reliable seal.

If the hole diameter is at the outside of the range of allowable values and and the panel's thickness is at the inside of the range of permissible panel thicknesses, it is evident that the grommet may slide around in its panel mounting. As so installed, with substantial vibration of the supported cable, the grommet cannot firmly position the cabling, and the vibrating cabling would force the grommet to slide back and forth in its panel mounting hole. However, despite such movement, the cabling cannot touch the metal edges. Further, should the installer make the cabling taut so that the cable cannot incur large vibrations, the tautness of the cable firmly forces the grommet against an edge of the hole, where it remains positioned and cannot move.

In an alternative embodiment of the invention, the fire resistant mat 2 may be omitted. So doing reduces the steps required to manufacture the grommet, and, accordingly, its manufacturing and material cost. Though providing a grommet configuration in the geometry described and illustrated, such alternative embodiment does not contain the better fire resistant quality provided by the mat, and is, therefore, less preferred.

Although the foregoing description addressed application in aircraft, as recognized by those skilled in the art, the invention is not so limited. It has application in other applications as well, such as in space craft, tanks, trains, automobiles and other vehicles. It can be applied for use in buildings and in various kinds of electrical and chemical equipment.

It is believed that the foregoing description of the preferred embodiments of the invention is sufficient in detail to enable one skilled in the art to make and use the invention. However, it is expressly understood that the detail of the elements presented for the foregoing purposes is not intended to limit the scope of the invention, in as much as equivalents to those elements and other modifications thereof, all of which come within the scope of the invention, will become apparent to those skilled in the art upon reading this specification. Thus the invention is to be broadly construed within the full scope of the appended claims.

What is claimed is:

1. A fire-resistant grommet for mounting into a hole in a panel, said grommet comprising:

a body portion defining a central passage therethrough and defining a pair of opposed outer surfaces extending radially outward from the central passage to define at least in part a pair of flanges, said body portion formed from a molded elastomeric material for resiliently engaging the edge of the hole in the panel between the flanges; and a fire-resistant fibrous mat integrated with the body portion on at least one of the outer surfaces, the fibrous mat being embedded in the outer surface of the body portion before the elastomeric material has fully cured such that portions of the elastomeric material extend into the spaces between the fibers of the fire-resistant mat to securely integrate the mat to the body portion when the elastomeric material is fully cured.

2. A grommet as defined in claim 1 wherein said pair of flanges comprise a front flange and a rear flange and wherein the maximum diameter of said front flange is greater than the maximum diameter of said rear flange.

3. A grommet as defined in claim 2 wherein said fire-resistant mat is integrated with the outer surface of the body portion defining said front flange.

4. A grommet as defined in claim 2 wherein said front flange defines a cross section having an arcuate outer surface.

5. A grommet as defined in claim 1 wherein said elastomeric body comprises a polysiloxane compound.

6. A grommet as defined in claim 1 wherein said fibrous mat comprises fiberglass.

7. A grommet as defined in claim 1 wherein said mat comprises Nextel ceramic fibers.

* * * * *

UNITED STATES PATENT AND TRADEMARK OFFICE
CERTIFICATE OF CORRECTION

PATENT NO. : 5,836,048

DATED : November 17, 1998

INVENTOR(S) : Rossman et al.

It is certified that error appears in the above-identified patent and that said Letters Patent is hereby corrected as shown below:

Title page, item [56] insert the following:

Line 3, "3,518,259" should read --3,518,359--; "Trimble" should read --Trimble et al.--.

Line 4, "Burns" should read --Burns et al.--.

Line 10, "Paterson" should read --Paterson et al.--.

Line 11, "Martin" should read --Martin et al.--.

Signed and Sealed this

Thirteenth Day of April, 1999

*Attest:*

Q. TODD DICKINSON

*Attesting Officer*  *Acting Commissioner of Patents and Trademarks*